United States Patent [19]
Lee et al.

[11] Patent Number: 5,381,582
[45] Date of Patent: Jan. 17, 1995

[54] COWL AND WINDHSIELD WIPER ASSEMBLY

[75] Inventors: James E. Lee, Davisburg; Douglas A. Street, Royal Oak, both of Mich.

[73] Assignee: Chrysler Corporation, Highland Park, Mich.

[21] Appl. No.: 179,283

[22] Filed: Jan. 10, 1994

[51] Int. Cl.⁶ ............................ B60S 1/04; B60S 1/06
[52] U.S. Cl. ................... 15/250.19; 15/250.16; 15/250.30; 296/192; 296/96.15
[58] Field of Search .......... 15/250.16, 250.17, 250.19, 15/250.3, 250.21, 250.23; 296/192, 194, 96.15, 202

[56] References Cited

U.S. PATENT DOCUMENTS

| | | | |
|---|---|---|---|
| 2,936,477 | 5/1960 | Feller | 15/250.19 |
| 3,226,756 | 1/1966 | Heiler | 15/250.19 |
| 3,314,195 | 4/1967 | Ziegler | 49/342 |
| 4,770,462 | 9/1988 | Kuraoka et al. | 296/192 |
| 4,783,876 | 11/1988 | Souma et al. | 15/250.17 |
| 4,874,199 | 10/1989 | Yamamoto | 296/192 |
| 4,962,564 | 10/1990 | Onda et al. | 15/250.19 |
| 4,982,993 | 1/1991 | Okazaki et al. | 296/192 |
| 5,065,474 | 11/1991 | Charng | 15/250.32 |

*Primary Examiner*—Stephen F. Gerrity
*Assistant Examiner*—Gary K. Graham
*Attorney, Agent, or Firm*—Edward P. Barthel

[57] ABSTRACT

A cowl adapted to conceal a windshield wiper assembly to eliminate the drag associated with exposed wiper assemblies. The assembly includes an enclosure having a top access door adapted to being flush with the hood in its lowered position, and a bottom panel adapted to effecting an extension of the windshield in its elevated position. A windshield wiper assembly includes a pivotally mounted wiper arm, with a wiper blade that is seated on the bottom panel for vertical movement therewith. Suitable power and lift apparatus serve to vertically raise and lower the enclosure in association with a plurality of fixed brackets that serve to guide the lift apparatus during its vertical movements.

6 Claims, 4 Drawing Sheets

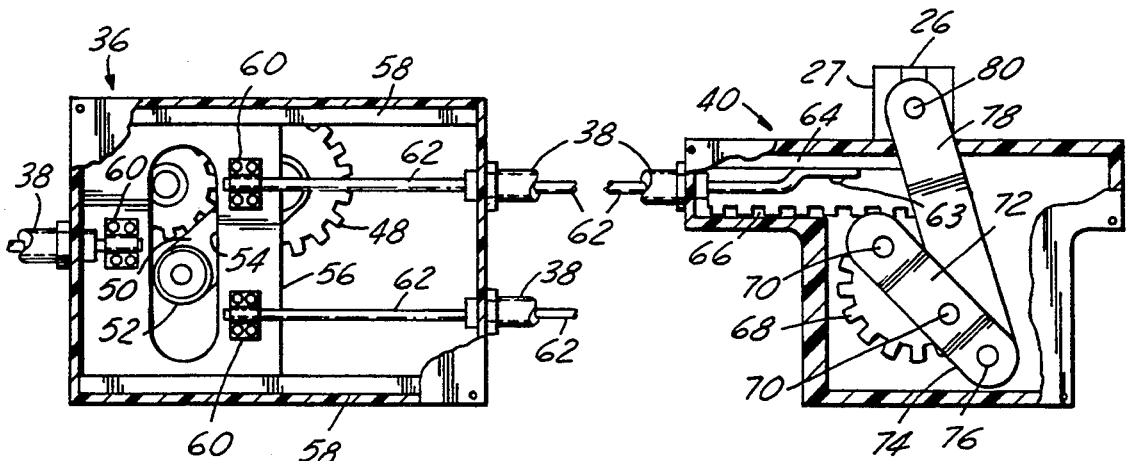
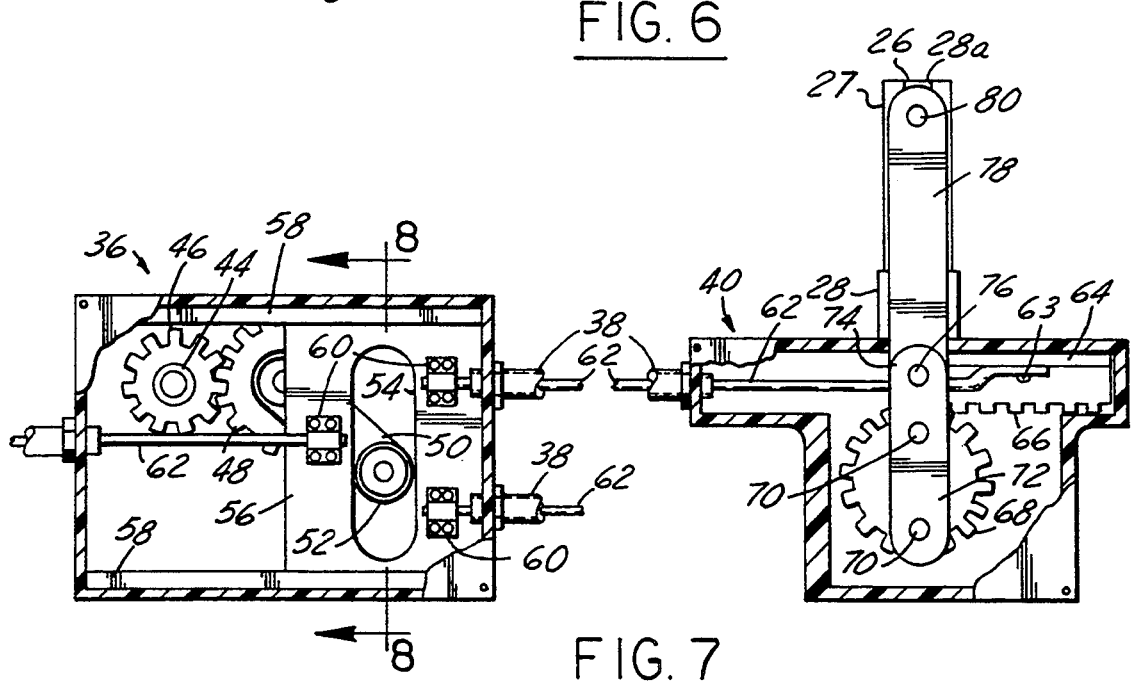
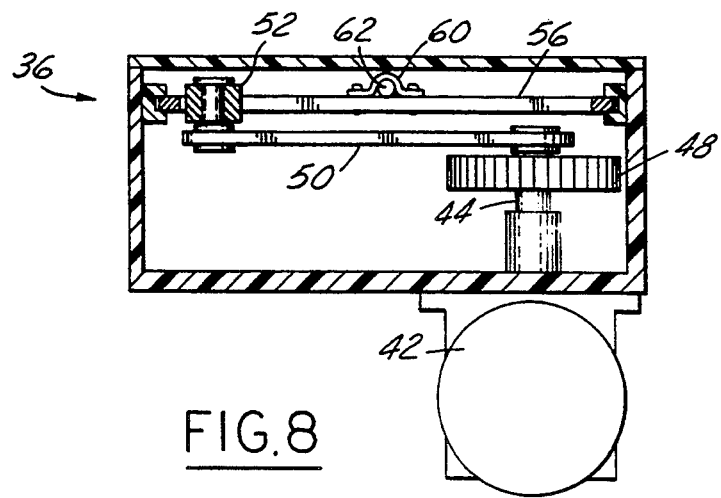

COWL AND WINDHSIELD WIPER ASSEMBLY

TECHNICAL FIELD

This invention relates generally to cowl and windshield wiper assemblies and, more particularly, to a wiper assembly which is concealed by a vertically movable cowl.

BACKGROUND ART

Heretofore, various cowl-covered windshield wiper assemblies have been proposed. For example, Feller U.S. Pat. No. 2,936,477 discloses a housing which is vertically slidably mounted beneath a cowl panel, and a series of levers connected between the cowl panel and the front wall of the housing for sliding the cowl panel forwardly upon elevation of the housing to raise the windshield wipers to usable height.

Heiler U.S. Pat. No. 3,226,756 and Ziegler U.S. Pat. No. 3,314,195 discloses a pair of hinged covers which are pivoted upwardly away from the bottom edge of the windshield to permit the wipers to ride up a curved ramp to the windshield.

Kuraoka U.S. Pat. No. 4,770,462 discloses a cover structure for a windshield wiper assembly, wherein oppositely disposed cowl-plates are lowered and pivoted forwardly under the hood to provide spaces through which two wiper blades are actuated.

Souma et al U.S. Pat. No. 4,783,876 discloses a cowl-louver which is either slidably movable forwardly beneath a hood to permit the wiper assembly to be pivoted into a usable position in the opening provided by the displaced louver or pivoted along with the wiper assembly.

Yamamoto U.S. Pat. No. 4,874,199 discloses a cowl panel which is shiftable and pivotable to uncover the windshield wipers.

Onda et al U.S. Pat. No. 4,962,564 discloses a pair of scissor-like link arrangements having rollers on the ends thereof for rolling in guides to raise and lower oppositely disposed cowls and windshield wiper assemblies.

Okazaki U.S. Pat. No. 4,982,993 discloses a cowl cover with linkage for lifting and pivoting same to provide an opening for the actuation of the windshield wipers.

DISCLOSURE OF THE INVENTION

A general object of the invention is to provide an improved cowl and windshield wiper assembly, wherein the latter assembly is concealed in order to eliminate the drag on the vehicle that is inherent in an exposed wiper assembly.

Another object of the invention is to provide a cowl and windshield wiper assembly wherein the cowl and a single wiper blade are vertically elevated to provide access to the windshield.

A further object of the invention is to provide a cowl and windshield wiper assembly including an enclosure having a top access door adapted to being flush with the hood in its lowered position, and a bottom panel adapted to effecting an extension of the windshield in its elevated position, a windshield wiper assembly including a pivotally mounted wiper arm and a wiper blade pivotally connected at the inner end thereof to the wiper arm and seated on the bottom panel for vertical movement therewith, and suitable power and lift apparatus for vertically raising and lowering the enclosure.

Still another object of the invention is to provide a cowl and windshield wiper assembly including an enclosure for a wiper blade and including a control box and associated lift units operatively guided in fixed brackets for vertically raising and lowering the enclosure and the wiper blade.

These and other objects and advantages will become more apparent when reference is made to the following drawings and the accompanying description.

BRIEF DESCRIPTION OF THE DRAWINGS

FIGS. 6 and 7 are enlarged cross-sectional views of further operating portions of the FIG. 1 structure in different operational positions;

FIG. 8 is a cross-sectional view taken along the plane of the line 8-8 of FIG. 7, and looking in the direction of the arrows.

BEST MODE OF CARRYING OUT THE INVENTION

Figure 1:
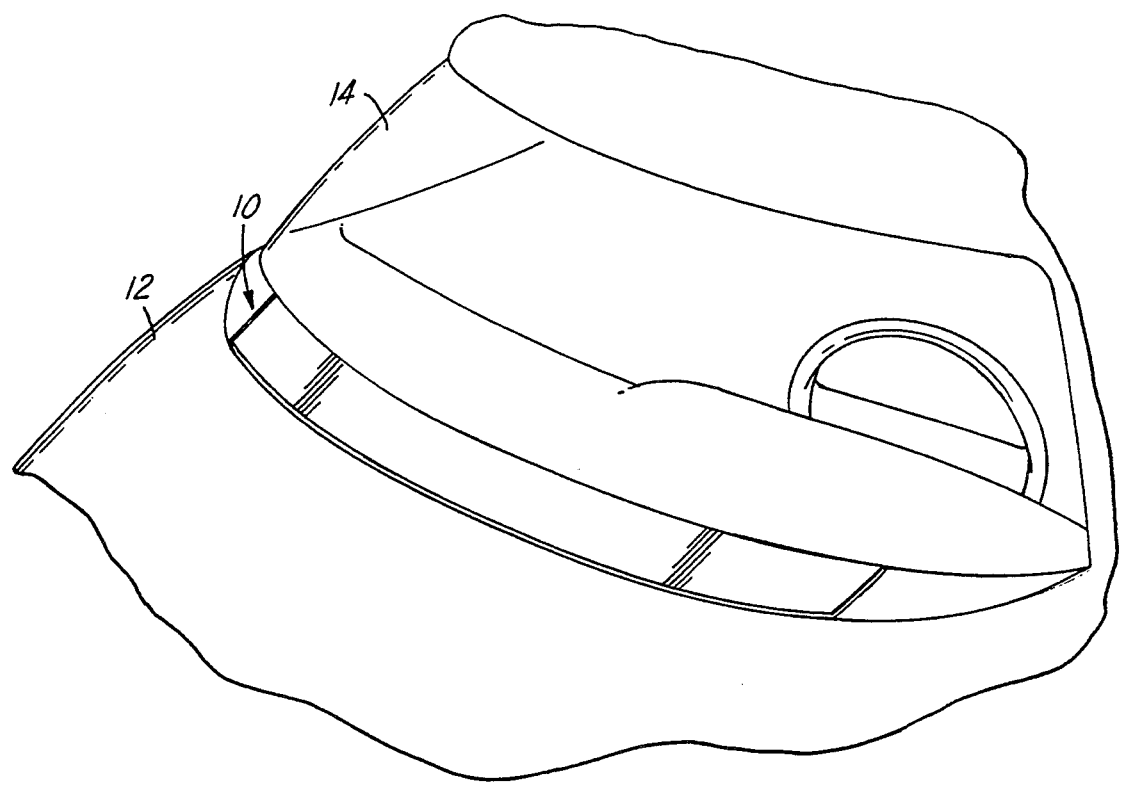
FIG. 1 is a fragmentary perspective view of a cowl and windshield wiper assembly embodying the invention.
Figure 2:
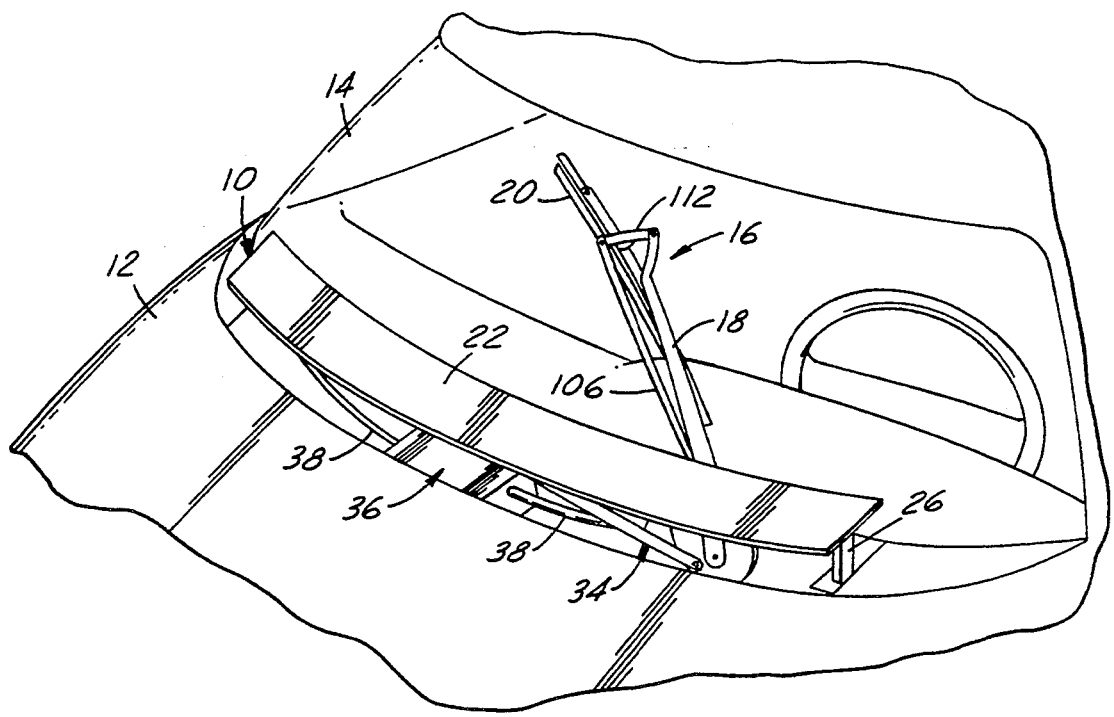
FIG. 2 is a fragmentary perspective view similar to FIG. 1 illustrating a different operational position.

Referring now to the drawings in greater detail, FIGS. 1 and 2 illustrate a vehicle cowl assembly 10 mounted intermediate a hood 12 and a windshield 14, and enclosing a windshield wiper assembly 16 including a wiper arm 18 and wiper blade 20. The cowl assembly 10 includes a hood access door 22 and a bottom panel 24, with the wiper blade 20 mounted in its stored position on the bottom panel.

Figure 3:
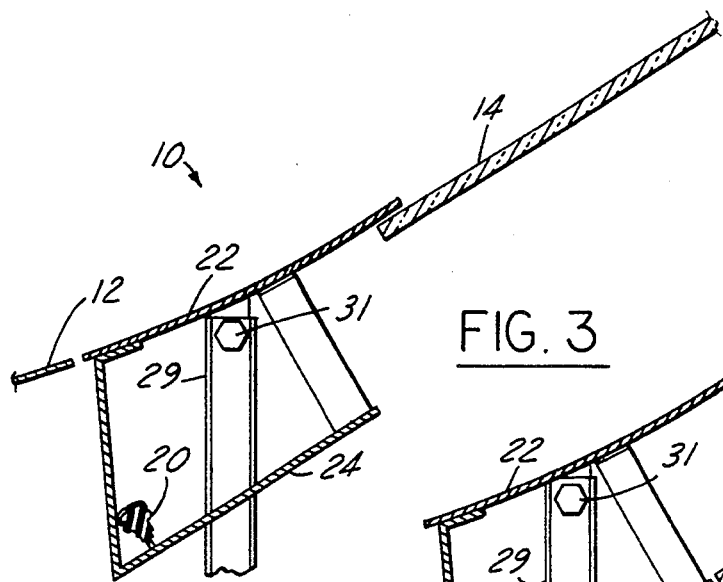
FIG. 3 is an enlarged side elevational view of a portion of the FIG. 1 structure.
Figure 4:
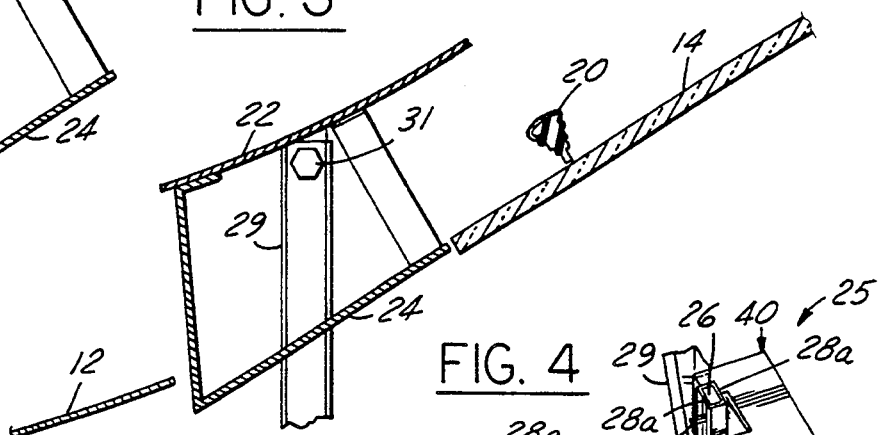
FIG. 4 is an enlarged side elevational view of the FIG. 3 portion in the operational position of FIG. 2.

When the wiper blade 20 is not needed, the cowl assembly 10 is in its lowered position, as shown in FIGS. 1 and 3, such that the access door 22 is flush with the hood 12 surface. When the wiper blade 20 is needed, the cowl assembly 10 is in its elevated position, as shown in FIGS. 2 and 4, such that the bottom panel 24 is essentially an extension of the windshield 14 (FIG. 4).

Figure 5:
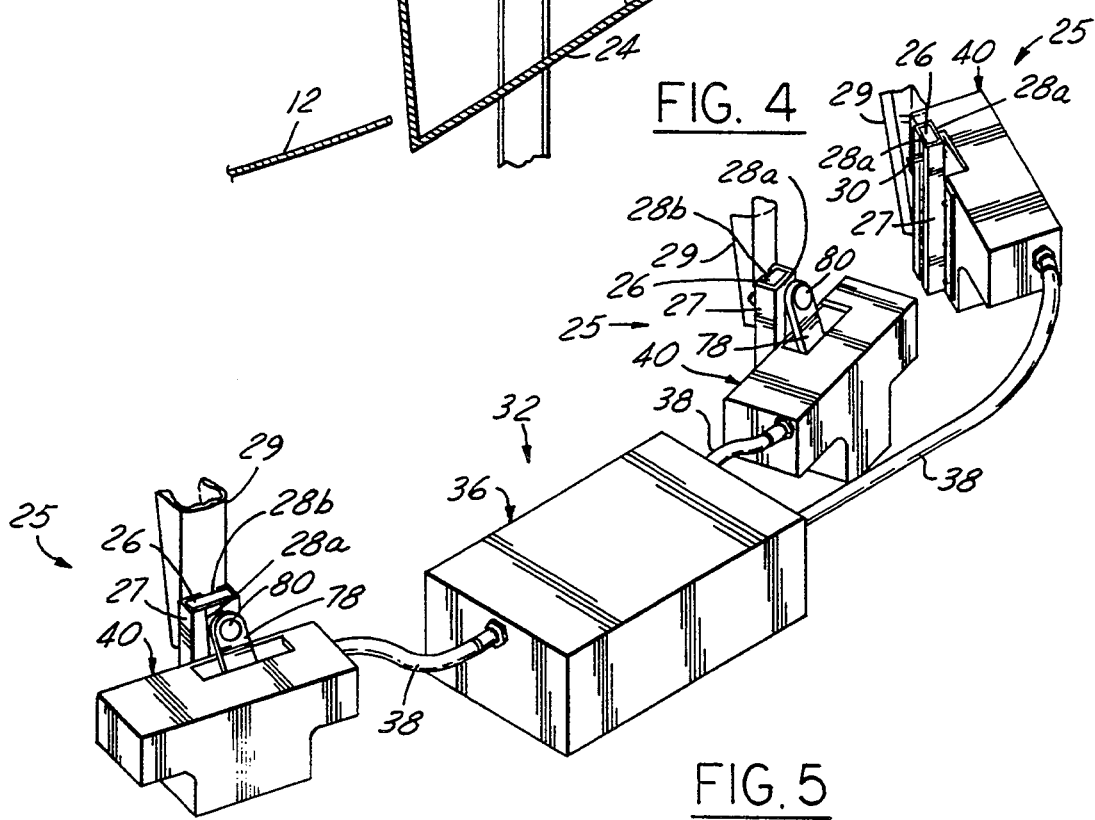
FIG. 5 is a perspective view of operating portions of the FIG. 1 structure.

As shown in FIG. 5, a plurality of spaced-apart lift assemblies 25 each includes a slide member 26 slidably mounted in a fixed bracket 27. Each bracket 27 has a first vertical opening 28a in the front and a second vertical opening 28b in the back. A lift member 29 is connected to the slide 26 by a pin 30 extended through the second vertical opening 28b. Each lift member 29 is connected by a fastener 31 (FIGS. 3 and 4) to the hood access door 22, serving to move the cowl assembly 10 in its vertical ascent and descent operations. A suitable electromechanical network, represented at 32, serves to raise and lower the slides 26, and, hence, the cowl assembly 10. Relay switches (not shown) and a suitable mechanical linkage system 34 (FIG. 9) serve to control the wiper assembly 16 actuation.

As shown in FIG. 5, the network 32 includes a control box 36 interconnected by three sheathed cables 38 to three lift units 40. More specifically, as shown in FIGS. 6-8, an electric motor 42 (FIG. 8) is mounted under the control box 36, with a drive shaft 44 extending from the motor 42 to a drive gear 46 (FIG. 7) in the control box 36. The drive gear 46 drives a larger driven gear 48. The latter gear is connected to one end of a link 50. A roller 52 is rotatably mounted on the distal end of the link 50 and fitted into a slot 54 formed in a sliding plate 56. The plate 56 is slidably mounted in nylon guides 58 fixedly secured in the control box 36. Three brackets 60 are secured to the plate 56. The brackets 60 serve to secure three respective ends of cables 62 slidably mounted in the sheathed cables 38.

In operation, as the plate 56 is caused to slide laterally (FIGS. 6 and 7) along the guides 58, the brackets 60 and the cables 62 are pulled or pushed laterally. As shown in FIGS. 6 and 7, the cables 62 extend into the respective lift units 40, where the ends thereof are secured by a fastener 63 to a gear rack 64. The teeth 66 of the rack 64 mesh with a gear 68 having two off-center studs 70 secured thereto. A first link 72 is secured to the studs 70 across the gear 68, with an end 74 extending beyond the periphery of the gear 68. A first pivot 76 mounted on the distal end 74 is pivotally connected to one end of a second link 78. A second pivot 80 mounted on the other end of the second link 78 is pivotally connected through the opening 28a in each bracket 27 to the respective slide member 26. Hence, as illustrated in FIGS. 6 and 7, as the plate 56 slides in the control box 36, the three slide members 26 are caused to raise and lower the lift members 29, thereby raising the cowl assembly 10 (FIG. 4), and lowering same (FIG. 3).

Once the cowl assembly 10 attains its elevated position (FIGS. 2 and 4), the wiper assembly 16 is actuated such that the blade 20 slides from the bottom panel 24 onto the windshield 14 to be caused to reciprocate thereon by the linkage system 34 (FIG. 2).

Figure 9:
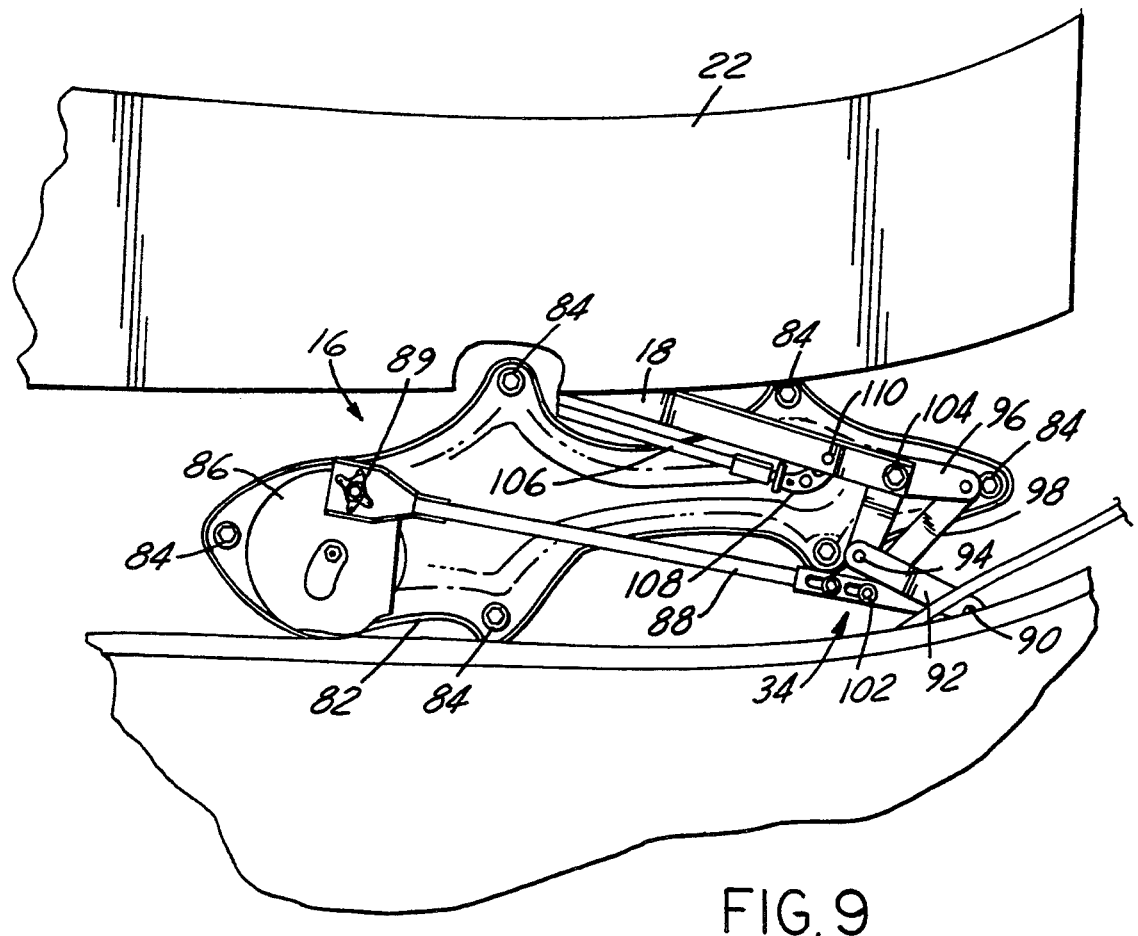
FIG. 9 is a side elevational view of the wiper assembly actuating mechanism.

A suitable linkage system 34 is shown in FIG. 9, manufactured by Trico Products Corporation. This system includes a mounting bracket 82 supported by six posts 84. An actuator 86 is rotatably mounted adjacent one end of the bracket 82. A lever 88 is pivotally mounted at one end thereof by a pivot 89 adjacent an edge of the actuator 86. The other end of the lever 88 is pivotally connected by a pivot 90 to an end of a link 92. The other end of the link 92 is pivotally connected by a pivot 94 to one end of a right-angled bracket 96 secured to an end of the wiper arm 18. A further link 98 is pivotally connected by a pivot 100 at one end thereof to the other end of the right-angled bracket 96, and by a pivot 102 at the other end thereof to the lever 88 a predetermined distance from the pivot 90. The end of the wiper arm 18 is pivotally secured by a pivot 104 adjacent the right-angled bracket 96. A rod 106 extends between an arcuate link 108 secured by a pivot pin 110 to the arm 18 and a connector link 112 (FIG. 2) pivotally connected to the arm 18 and the blade 20.

In operation, rotation of the actuator 86 reciprocally moves the lever 88 to thereby provide reciprocal crisscross action to the links 92 and 98 connected to the right angled bracket 96 and reciprocally move the wiper arm 18 and blade 20.

Industrial Applicability

It should be apparent that the invention provides an elevator-type cowl and windshield wiper assembly which eliminates drag on the vehicle by concealing the wiper assembly by a top cover which is flush with the hood when lowered, and includes a bottom support panel which effectuates an extension of the vehicle windshield when elevated, to accommodate actuation of the wiper assembly.

It should also be apparent that, while one long windshield wiper assembly is shown and described, two smaller assemblies could be incorporated in the system.

While but one embodiment of the invention has been shown and described, other modifications thereof are possible within the scope of the following claims.

What is claimed is:

1. For use between a vehicle hood and windshield, a cowl and windshield wiper assembly comprising an enclosure having a top access door defining a surface adapted to be flush with a surface of the hood under one operative position of the enclosure, and a bottom panel adapted to effect an extension of a lower edge of the windshield in a second operative position of the enclosure, a windshield wiper assembly including on elongate wiper arm pivotally mounted in said enclosure and a wiper blade pivotally connected to one end of said wiper arm and seated on said bottom panel for vertical movement therewith, a plurality of vertically oriented elongated fixed brackets, and a plurality of slide members operatively connected to said enclosure and slidably mounted in respective fixed brackets for vertically moving and guiding of said enclosure, and actuator means for vertically raising and lowering said slide members, wherein said actuator means includes an electric motor, a plate member operatively connected to said electric motor and adapted to be moved thereby, a plurality of lift unit, each said unit supporting one of said brackets, and a plurality of cables coupled with and extending from said plate member to respective lift units and mechanically coupled thereat with said slide members to lift and lower said slide members.

2. The cowl and windshield wiper assembly described in claim 1, including a central bracket and slide member and two adjacent brackets and slide members.

3. The cowl and windshield wiper assembly described in claim 1, and means for oscillating said windshield wiper assembly over the windshield.

4. The cowl and windshield wiper assembly described in claim 1, and actuating means for reciprocally moving said wiper assembly away from said bottom panel and along the windshield with said bottom panel in said second operative position.

5. The cowl and windshield wiper assembly described in claim 1, wherein said plate member is slidably movable and said actuator means further includes an elongated link slidably connected at one end thereof to said plate member, a driven gear secured to the other end of said link, and a drive gear meshed with said driven gear and coupled to said electric motor.

6. The cowl and windshield wiper assembly described in claim 1, wherein said lift units each include a movable gear rack connected to a respective cable, a gear in mesh with said movable gear rack and movable thereby, a first link rotatably secured to said gear, and an elongate second link pivotally connected at respective ends thereof to said first link and to a respective slide member.

* * * * *